United States Patent [19]

Tomlinson, III

[11] 4,299,488
[45] Nov. 10, 1981

[54] TIME-DIVISION MULTIPLEXED SPECTROMETER

[75] Inventor: Walter J. Tomlinson, III, Holmdel, N.J.

[73] Assignee: Bell Telephone Laboratories, Incorporated, Murray Hill, N.J.

[21] Appl. No.: 96,686

[22] Filed: Nov. 23, 1979

[51] Int. Cl.³ .......................... G01J 3/12; G01J 3/18; G01J 3/28; H04B 9/00
[52] U.S. Cl. ................................ 356/328; 356/333; 356/334; 455/612
[58] Field of Search ........................... 356/324–334; 455/610, 612, 617; 250/227

[56] References Cited

U.S. PATENT DOCUMENTS

| | | | |
|---|---|---|---|
| 2,856,531 | 10/1958 | Brouwner | 356/334 |
| 3,472,596 | 10/1969 | Mandelberg | 356/334 |
| 3,532,429 | 10/1970 | Hughes et al. | 356/97 |
| 3,838,278 | 9/1974 | Du Guay et al. | 250/227 |
| 3,845,294 | 10/1974 | Indig et al. | 250/199 |
| 3,863,063 | 1/1975 | Indig et al. | 455/610 |
| 4,111,524 | 9/1978 | Tomlinson | 350/96.16 |
| 4,128,759 | 12/1978 | Hunt et al. | 350/96.13 |
| 4,164,373 | 8/1979 | Schuss et al. | 356/316 |

OTHER PUBLICATIONS

Cohen, L. G., "A Universal Fiber-Optic (UFO) Measurement System Based on/a Near-IR Fiber Raman Laser", *IEEE Jr. of Quantum Electronics*, vol. QE14 #11, 11–1978, pp. 855–859.

Miller, C. M., "A Fiber-Optic-Cable Connector". B.S.T.J. vol. 54, 11–1975, pp. 1547–1555.

Tomlinson, W. J. "Wavelength Multiplexing in Multimode Optical Fibers", App. Optics, 8–1977, pp. 2180–2194.

*Primary Examiner*—William H. Punter
*Attorney, Agent, or Firm*—Michael B. Einschlag

[57] ABSTRACT

A time-division multiplexed spectrometer (TMS) which can convert the output from a pulsed continuum radiation source into a time- and wavelength-division multiplexed pulse train is provided, by a single spectrometer (1, 2) when: (a) an input source (100) is terminated at the image plane of the spectrometer at a first position which is displaced from the symmetry plane, (b) the first end of a set of optical fibers (100–110), each having a different length, are determined at the image plane at positions which are displaced in the opposite direction from the symmetry plane as is the first position, whereby narrow-band portions of the output spectrum are picked up and delayed by different amounts, (c) the second end of the set are terminated at the image plane at positions which are reflections of the terminations of the first end about the symmetry plane, whereby the signals are reinjected into the instrument and refocused onto a second position at the image plane corresponding to the reflection of the first position about the symmetry plane, and (d) an optical receptor is terminated at the second position.

8 Claims, 8 Drawing Figures

4,299,488

TIME-DIVISION MULTIPLEXED SPECTROMETER

BACKGROUND OF THE INVENTION

This invention pertains to the field of spectrometers and more particularly to time-division multiplexed spectrometers.

Optical communications systems shown in U.S. Pat. Nos. 3,845,294 and 3,863,063 provide for multiplexing and demultiplexing of optical pulses by means of separate apparatus. This results in problems with respect to the tracking between the separate multiplexing and demultiplexing apparatus and problems in the alignment and operation of an optical communications system using these separate apparatus.

SUMMARY OF THE INVENTION

A time-division multiplexed spectrometer (TMS) which can convert the output from a pulsed continuum radiation source into a time- and wavelength-division multiplexed pulse train is provided, according to the present invention, by a single multichannel-monochromator or polychromator.

In a first embodiment, an input source, e.g., an optical fiber, is terminated at the image plane of a Littrow-mount grating spectrometer at a first position which is displaced from the symmetry plane. This produces an output spectrum that appears at the image plane at positions which are displaced in the opposite direction from the symmetry plane as is the first position. A number of narrowband signals from the output spectrum are coupled to a set of optical fibers having a first end terminated at the image plane. These fibers each have a different length and thus delay each narrowband portion of the output spectrum by a different amount. The second end of each of the optical fibers is terminated at the image plane at the point corresponding to the reflection in the symmetry plane of the first and of that optical fiber. The spectrometer then focuses all the narrowband signals from these fibers onto a single optical receptor, e.g., an optical fiber, terminated at the image plane at a point corresponding to the reflection about the symmetry plane of the termination of the optical source in the image plane.

BRIEF DESCRIPTION OF THE DRAWING

A complete understanding of the present invention may be gained from a consideration of the detailed description presented hereinbelow in connection with the accompanying drawings in which.

DETAILED DESCRIPTION

Figure 1:
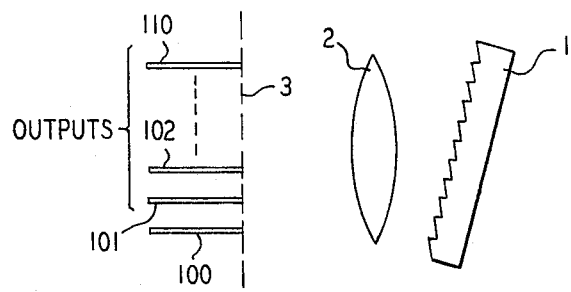
FIG. 1 shows, in diagrammatic form, a top view of a polychromator in the prior art, with an optical fiber input and optical fiber outputs, said polychromator using a Littrow-mount grating spectrometer.
Figure 2:
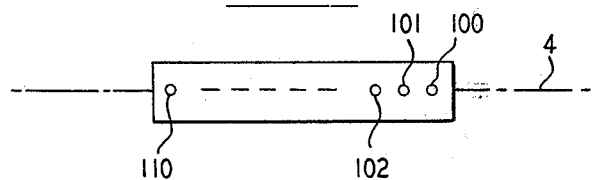
FIG. 2 shows the image plane of the polychromator of FIG. 1 as viewed along the direction of input fiber 100.

FIG. 1 shows a polychromator comprising a Littrow-mount grating spectrometer, an input fiber 100 and output fibers 101-110, the spectrometer comprising grating 1 and lens 2. Input fiber 100 and output fibers 101-110 are terminated at image plane 3 of the polychromator. FIG. 2 shows that in a conventional design input fiber 100 and output fibers 101-110 would be arranged in a straight line in the image plane 3 of the polychromator, centered on the symmetry plane 4.

Figure 3:
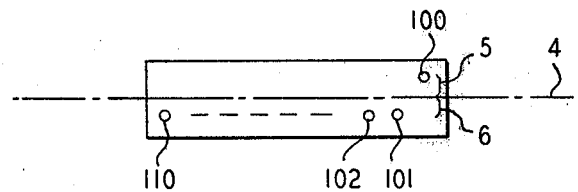
FIG. 3 shows the image plane of the polychromator of FIG. 1 as viewed along the direction of input fiber 100, input fiber 100 and output fibers 101-110 being shifted in position in accordance with the present invention.

According to a first embodiment of the present invention, input fiber 100 is displaced from the symmetry plane 4 of the polychromator by a first distance 5 which is somewhat larger than the diameter of the optical fiber. This has the effect of displacing the output spectrum from the position obtained in the conventional design by a distance 6 equal to the first distance but in the opposite direction from that displacement. Now output fibers 101-110 must be relocated to the positions shown in FIG. 3. The symmetry of the polychromator provides that a reflection of the input fiber 100 and output fibers 101-110 in the symmetry plane produces two independent, but completely equivalent devices. We utilize one of these devices to provide a demultiplexing function and the other device to provide a multiplexing function.

Figure 4:
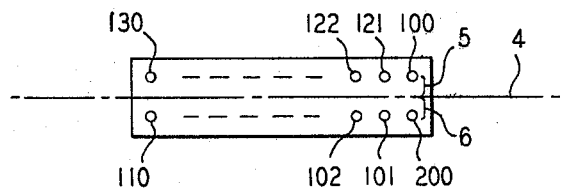
FIG. 4 shows the image plane of an embodiment of the present invention when viewed along the direction of input fiber 100.
Figure 5:
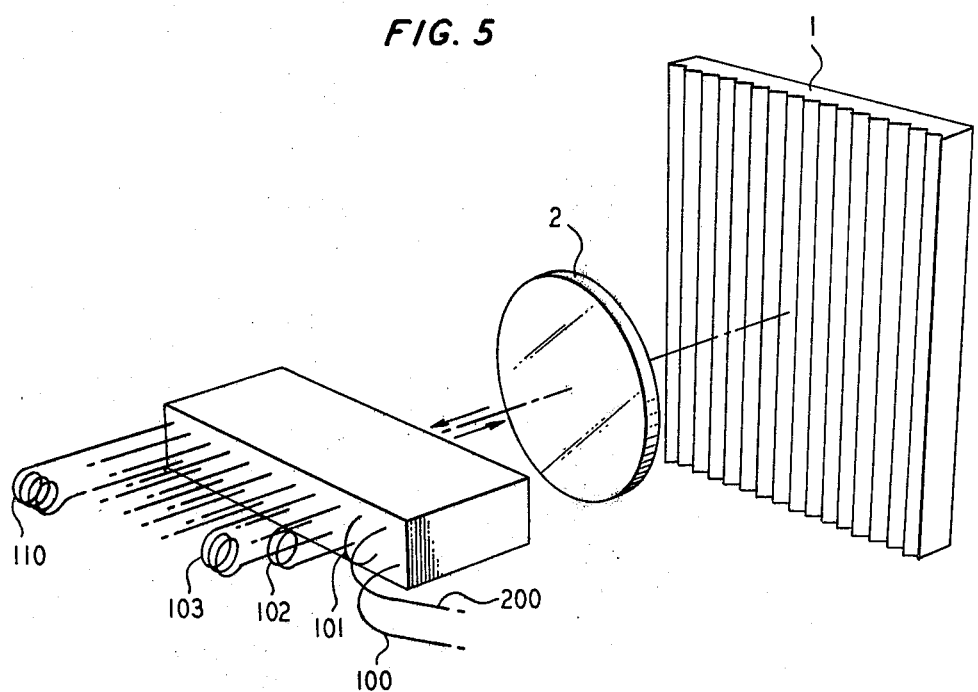
FIG. 5 shows a perspective view of an apparatus constructed according to the present invention.

FIG. 4 shows the position of input fiber 100 which provides a spectrum at the image plane. Part of this spectrum is picked up by a first end of a set of output fibers at positions indicated by 101-110. In one embodiment these fibers have different lengths, which different lengths delay different portions of the output spectrum by a different amount. These portions of the output spectrum are coupled back into the device by a second end of the set of output fibers at positions indicated by 121-130. Positions 121-130 are reflections of positions 101-110 about the symmetry plane. The radiation coupled back into the device at points 121-130 emerges from the device at final output fiber 200. Output fiber 200 is terminated at the image plane at the reflection about the symmetry plane of the termination of input fiber 100. A perspective view of the entire apparatus is shown in FIG. 5.

Figure 7:
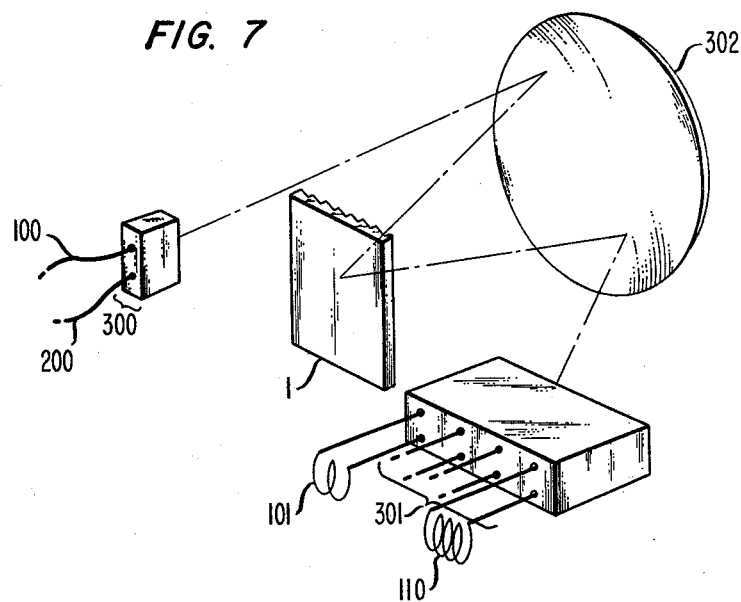
FIG. 7 shows an embodiment of the present invention which utilizes an Ebert-mount spectrometer.
Figure 8:
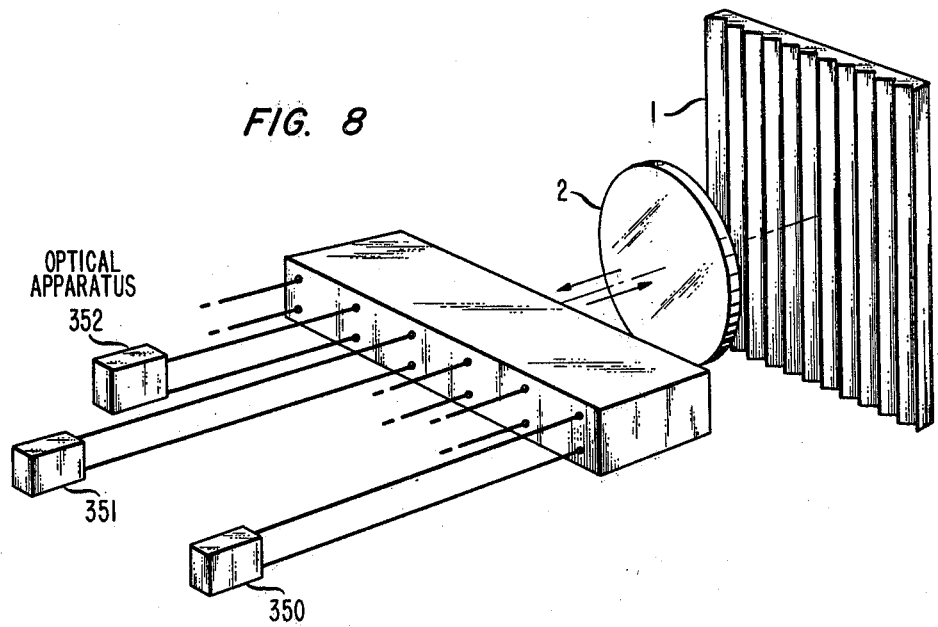
FIG. 8 shows an embodiment of the present invention where optical devices are placed in the paths of the demultiplexed signals.

Although the embodiment disclosed utilizes a Littrow-mount grating spectrometer comprising grating 1 and lens 2, other design spectrometers could also be used. For example, FIg. 7 shows an embodiment of the present invention which utilizes an Ebert-mount spectrometer, see an article entitled "A Small Plane Grating Monochromator", *Jrnl. of Opt. Soc. Amer.*, Vol. 42, No. 9, Sept. 1952, pp,. 641-647 by W. G. Fastie. Input and output fibers 100 and 200 are held on a first image plane at position 300 and array of coupling fibers 101-110 are held on a second image plane at position 301. The Ebert-mount utilizes grating 1 and concave mirror 302. Furthermore, the invention need not be restricted to the embodiment described hereinabove. It should be clear to those skilled in the art that the de-multiplexed radiation need not be restricted to passing through optical fibers of different lengths, but may also be transmitted through any other apparatus before it is multiplexed. This is illustrated in FIG. 8 where the demultiplexed radiation is passed through optical apparatus 350–352.

In general, there is some wavelength that is coupled directly from input fiber 100 to output fiber 200. In most cases this does not cause any problems and may actually be useful as it provides an additional wavelength channel. If it is desirable to eliminate this channel, referred to as the straight-through channel, one may use a spectrometer design, such as an Ebert mount, in which the input and output image planes are physically separated. Alternatively, one could arrange input fiber 100 and output fiber 200 to have different length offsets from the symmetry plane. Note that there is no requirement that positions 101–110 be the same distance from the symmetry plane 4 as are positions 121–130, merely that the offset for positions 100 and 101–110 be the same magnitude and the offset for positions 200 and 122–130 be the same magnitude. However, in practice, the two offsets should be kept small so as to avoid the effects of off-axis aberrations.

The interchannel wavelength spacing, $\Delta\lambda$, of the time-division-multiplexed spectrometer device, and the channel bandwidth, $\delta\lambda$ (full width at half peak transmission) are related to the parameters of the fiber array by:

$$\delta\lambda/\Delta\lambda = ad/D \quad (1)$$

where D is the center-to-center spacing of the fibers in the array, d is the fiber core diameter, and a is the lateral offset that gives an excess loss of 1.5 dB in a butt joint between two fibers of the type used in the array (measured as a fraction of the core radius). For typical graded-index fibers $a \approx 0.65$, while for step-index fibers $a \approx 0.8$.

To design an instrument for a particular application one can use Eq. (1) to determine the value of the fiber spacing, D, that gives the desired ratio $\delta\lambda/\Delta\lambda$. The required linear dispersion of the spectrometer is then $\Delta\lambda/D$. Techniques for designing a spectrometer with a specified dispersion are well known to those skilled in the art.

In Table I, I give rough estimates of the various losses in a device using a Littrow-mount grating spectrometer. These are by no means ultimate limits, but rather estimates of what should be achievable with readily available components. I assume a blazed grating used close to the blaze angle. For operation far from the blaze angle the grating losses would be somewhat larger.

TABLE I

| Source | Estimated Losses of a TMS | | |
|---|---|---|---|
| | Loss/pass (db) | Passes | Total (db) |
| Grafting | 1 | 2 | 2 |
| Lens | 1.5 | 4 | 6 |
| Coupling | 1 | 2 | 2 |
| | | Total loss | 10 |

The largest loss contribution is from the lens, primarily because the light passes through it four times. For the minimum possible loss one would choose a lens with the fewest possible elements (consistent with the required imaging characteristics) and have all the surfaces antireflection coated for the particular wavelength region to be used. The loss in coupling to the output fibers includes all the effects of aberrations in the lens and mechanical misalignments. To achieve our estimated coupling loss of $\approx 1$ dB per pass the lateral aberrations of the fiber images and the misalignments each need to be <10 percent of the fiber core diameter. For applications in which it is particularly important to minimize losses, one should be able to do somewhat better than the estimates in Table I. As an indication of how much better, I point out that wavelength-division multiplexers have been reported with insertion losses of $\leq 2$ dB, so in double pass such devices would have loss of $\leq 4$ dB, or $\geq 40$ percent transmission.

I have built a time-multiplexed spectrometer according to the present invention.

For the fiber array I used a 24-fiber silicon-chip connector. In these connectors the fibers are held in grooves, etched in wafers of single-crystal silicon. Photolithographic processes are used to determine the groove positions, and, by choosing the proper crystal orientations, the etching process gives grooves with trapazoidal cross sections. Using this technique, connectors with up to 144 fibers (a 12×12 array) have been made (see for example an article entitled, "A Fiber-Optic-Cable Connector" by C. M. Miller, *Bell System Technical Journal*, Vol. 54, No. 9, November 1975, pp. 1547–1555), with maximum errors in the fiber positions of 2.5 $\mu$m. The connector we used had two rows of 12 fibers each. The center-to-center fiber spacing in each row was D=229 $\mu$m, and the two rows were spaced by 520 $\mu$m. The fibers were graded-index fibers with core diameters d=55 $\mu$m, and numerical apertures of about 0.23.

The fibers in each row of my array were formed into 12-fiber ribbons each ribbon was terminated in a 12-fiber silicon-chip connector. To provide different delays for each channel of the device, one could prepare a set of fibers of different lengths, with similar connectors on each end, and insert it between the two 12-fiber connectors from my array. However, for my study I just connected the two ribbons together directly. This does not provide for different delay times for the various channels but it permitted me to measure the spectral response function of the instrument. Two fibers, one from the same side of each ribbon, were separated from the ribbons to serve as the input and output fibers.

My spectrometer consisted of a 50-mm focal-length lens (Kowa TV lens 1:1.3/50) and a 300 groove/mm grating blazed for 10°25' (Bausch & Lomb, model 35-53-04-640). The grating surface was coated with gold for maximum reflectivity in the infrared, although all of the experiments were done using the grating in second order with visible light. At the first-order blaze wavelength ($\lambda_B = 1.2$ $\mu$m), the calculated linear dispersion of the instrument is $1.525 \times 10^4$, and at the second-order blaze wavelength it is twice as large. From the fiber spacing (D=229 $\mu$m) I calculate an interchannel spacing of $\Delta\lambda = 7.5$ nm (in second order). Making use of Eq. (1), and assuming a=0.65, gives a predicted channel bandwidth of $\delta\lambda = 1.2$ nm.

To determine the spectral response function of the instrument, I used a Tungsten "point" source (Oriel Model 6340), with a color temperature of 3200° K., which was focused on the end of the input filter 100. The spectrum of the light from the output filter 200 was measured using a Jarrel-Ash 0.25-m grating monochromator and a type 6256 photomultiplier (S-20 spectral response). The input fiber serves as the input slit, and with a 250-μm output slit the calculated resolution of the monochromator is 0.8 nm.

Figure 6:
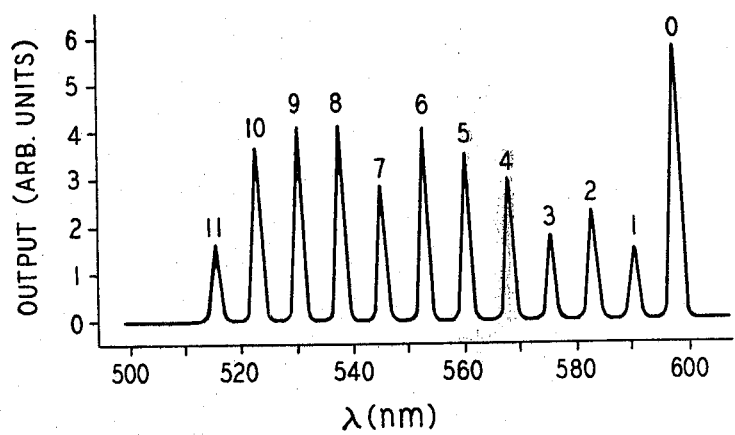
FIG. 6 shows, in graphical form, the spectrally resolved output from an experimental embodiment of the present invention.

A typical output spectrum is shown in FIG. 6 and clearly displays the 12 channels. The measured inter-channel spacing of 7.5 nm is in good agreement with the predicted value. Of greater significance is the fact that the measured channel bandwidths are 1.44 nm, and accounting for the 0.8 nm resolution of the measuring monochromator, this gives a bandwidth of 1.2 nm, which bandwidth is also in good agreement with predicted value. As expected, the straight-through channel (at $\lambda \approx 598$ nm) has a larger bandwidth and less loss than the other channels. By simply changing the grating angle, I was able to shift the response of the instrument to longer or shorter wavelengths.

I measured output spectra for several different grating angles, and by correcting for the source spectrum and the spectral response of the detector I determined the relative transmissions of all the channels. I was able to fit all this data by assuming that each particular channel has a fixed loss, independent of wavelength, and that the grating loss is a smooth function of wavelength, independent of channel number. The individual channel losses were within ±0.5 dB of their average, except for channels 3, 7 and 11, which had losses 2-3 dB larger than the average. (In FIG. 6 one can see that the signals from these channels fall below the envelope of the other channel outputs). There was no observable trend in the channel losses, indicating that the lens distortion was negligible. The larger losses of channels 3, 7 and 11 are evidently the result of losses in those particular fibers (possibly bending loss in the array or connector).

The loss of the straight-through channel was about 7.5 dB less than the average loss of the other channels, and since the straight-through channel should have half the loss of the other channels, I estimate that the total insertion loss of the instrument was about 15 dB. The measured grating loss (at $\lambda = 633$ nm) was 3 dB, and the lens loss was 1.5 dB. (The grating loss is higher than the estimate in Table I because the grating was being used in second order, and because it had a gold surface). From the above results I deduce that the average coupling loss was 1.5 dB per pass. This is somewhat higher than the estimate in Table I, but in view of the larger losses for three of the channels, it is not unreasonable to suspect that part of this is loss in the array and connector.

On the basis of all of the above results, I conclude that the spectral characteristics of actual devices are quite adequately described by the simple analysis given above.

The TMS may be used in a Universal Fiber-Optic Measurement System, as disclosed in an article entitled, "A Universal Fiber-Optic (UFO) Measurement System Based on a Near-IR Fiber Raman Laser", *IEEE Jrnl. of Quantum Electronics*, Vol. QE-14, No. 11, Nov. 1978, pp. 855-859. This system uses a mode-locked, Q-switched Nd:YAG laser pumping a fiber Raman laser to generate a 0.3-nsec pulsed continuum from 1.1 to 1.6 μm, and a monochromator is used to select a narrow-band signal from the continuum. This signal is then coupled to the test fiber and used to measure the attenuation, pulse broadening and pulse delay at different wavelengths. By replacing the monochromator shown therein with a TMS, all of these measurements can be made with a single pulse. Even when sampling techniques are necessary to achieve the desired time resolution, the TMS enables one to make more efficient use of the source. The TMS is particularly useful for measurements of the wavelength dependence of the pulse delay in the vicinity of the zero-material-dispersion wavelength, because the pulses at the various wavelengths all travel down the test fiber together. This means that one only needs to measure the time intervals between them, rather than the (much longer) total propagation delay of the fiber.

For time-resolved spectroscopy the light transmitted, or emitted by a sample is coupled to the TMS, and the output of the TMS is then coupled directly to a detector. In my studies I used a photomultiplier detector, but I expect that for many applications it will be preferable to use a solid-state photodiode. The use of a photodiode detector would permit the complete TMS to be made into a convenient, relatively compact package. Note that for use with hazardous samples, or samples in hazardous environments, the input filter could be made long enough so that the TMS and its user could be located in a safe area.

I claim:

1. A time-division multiplexed spectrometer which comprises:
    a spectrometer (1,2) having an image plane and a symmetry plane;
    characterized in that
    said spectrometer further includes:
    an optical source (100) disposed at a first position on said image plane and displaced a first distance from the intersection of said symmetry plane and said image plane;
    a plurality of optical fibers (101-110), each having a first end disposed in a first straight line and a second end disposed in a second straight line, said first straight line being disposed in said image plane, parallel to and displaced from said intersection at said first distance on the opposite side of said symmetry plane from said input source, whereby narrowband portions of the spectrum of radiation coupled into the spectrometer by said input source are coupled into said fibers, said second straight line being disposed in said image plane, parallel to and displaced from said intersection at a second distance on the same side of said symmetry plane as said input source; and
    an optical receptor (200) disposed at a second position on said image plane, at said second distance on the opposite side of said symmetry plane from said input source.

2. The time-division multiplexed spectrometer as defined in claim 1 wherein said spectrometer is a Littrow grating spectrometer (1, 2).

3. The time-division multiplexed spectrometer as defined in claim 2 in which said plurality of optical fibers have different lengths, whereby said narrowband portions of the spectrum are delayed by different amounts.

4. The time-division multiplexed spectrometer as defined in claim 1 wherein said spectrometer is an Ebert-mount spectrometer.

5. The time-division multiplexed spectrometer as defined in claim 3 wherein said first distance is substantially the same as said second distance.

6. Device for selectively operating on narrowband portions of an optical signal by a plurality of devices having at least two ports in an optical transmission system which comprises:

a spectrometer (1, 2) having an image plane and a symmetry plane chracterized in that said spectrometer further includes:

an optical source (100) which transmits said optical signal, said optical source being terminated at a first position on on said image plane and displaced a first distance from the intersection of said symmetry plane and said image plane;

a first plurality of optical fibers, each having a first end disposed in a first straight line and a second end terminated at one of said at least two ports of said plurality of devices, said first straight line being disposed in said image plane, parallel to and displaced from said intersection at said first distance on the opposite side of said symmetry plane from said input source, whereby narrowband portions of the said optical pulse coupled into the spectrometer are transmitted to said plurality of devices;

a second plurality of optical fibers, each having a first end disposed in a second straight line and a second end terminated at a second one of said at least two ports of said plurality of devices, said second straight line being disposed in said image plane, parallel to and displaced from said intersection at a second distance on the same side of said symmetry plane as said input source, whereby said narrowband portions of said optical pulse are inserted into said spectrometer after they have been operated on by said plurality of devices; and an optical receptor (200) disposed at a second position on said image plane, at said second distance on the opposite side of said symmetry plane from said input source.

7. The device as defined in claim 6 wherein said spectrometer is Littrow grating spectrometer.

8. The device as defined in claim 7 wherein said first distance is substantially the same as said second distance.

* * * * *